(12) United States Patent
Hayashi

(10) Patent No.: US 7,339,599 B2
(45) Date of Patent: Mar. 4, 2008

(54) IMAGE-PROCESSING APPARATUS AND METHOD, COMPUTER PROGRAM, AND COMPUTER-READABLE STORAGE MEDIUM FOR DISCOURAGING ILLEGAL COPYING OF IMAGES

(75) Inventor: Junichi Hayashi, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 10/762,038

(22) Filed: Jan. 20, 2004

(65) Prior Publication Data

US 2004/0150859 A1 Aug. 5, 2004

(30) Foreign Application Priority Data

Jan. 22, 2003 (JP) .............................. 2003-013735
Jan. 22, 2003 (JP) .............................. 2003-013736

(51) Int. Cl.
G09G 5/00 (2006.01)
G06K 9/00 (2006.01)
G06K 1/00 (2006.01)
G06K 15/00 (2006.01)

(52) U.S. Cl. ..................... 345/629; 382/100; 358/1.13; 358/1.14

(58) Field of Classification Search ...... 358/1.13–1.14; 345/629; 399/366; 382/100
See application file for complete search history.

(56) References Cited

U.S. PATENT DOCUMENTS 6,011,857 A * 1/2000 Sowell et al. ............... 382/100
6,103,353 A * 8/2000 Gasper et al. ........... 428/195.1
6,427,020 B1 * 7/2002 Rhoads ...................... 382/100
6,515,755 B1 * 2/2003 Hasegawa .................. 358/1.14
6,664,976 B2 * 12/2003 Lofgren et al. ............. 345/634
6,738,491 B1 * 5/2004 Ikenoue et al. ............. 382/100
6,751,320 B2 * 6/2004 Rhoads ....................... 380/54
6,823,075 B2 * 11/2004 Perry ......................... 382/100
6,901,236 B2 * 5/2005 Saitoh et al. ............... 399/366
6,970,259 B1 * 11/2005 Lunt et al. .................. 358/1.14
2003/0021437 A1 * 1/2003 Hersch et al. .............. 382/100
2003/0179412 A1 * 9/2003 Matsunoshita
2004/0021311 A1 * 2/2004 Shimada et al. .............. 283/72

FOREIGN PATENT DOCUMENTS

| JP | 2001-197297 A | 7/2001 |
| JP | 2001-238075   | 8/2001 |
| JP | 2001-346032 A | 12/2001 |
| JP | 2002-305646 A | 10/2002 |

* cited by examiner

Primary Examiner—Jin-Cheng Wang

(57) ABSTRACT

An object of the present invention is to provide a technique by which machines can determine whether printed material is an original or a copy. A technique for outputting printed material which has an effect similar to that of security paper using normal paper instead of specially printed paper such as the security paper is provided. An image-processing apparatus generates a new image by expressing a latent image area with dots of a first dot size and a background area with dots of a second dot size which is different from the first dot size, and generates another image by moving each of the dots included in the latent image area in accordance with a bit value at the corresponding bit position in additional information.

14 Claims, 17 Drawing Sheets

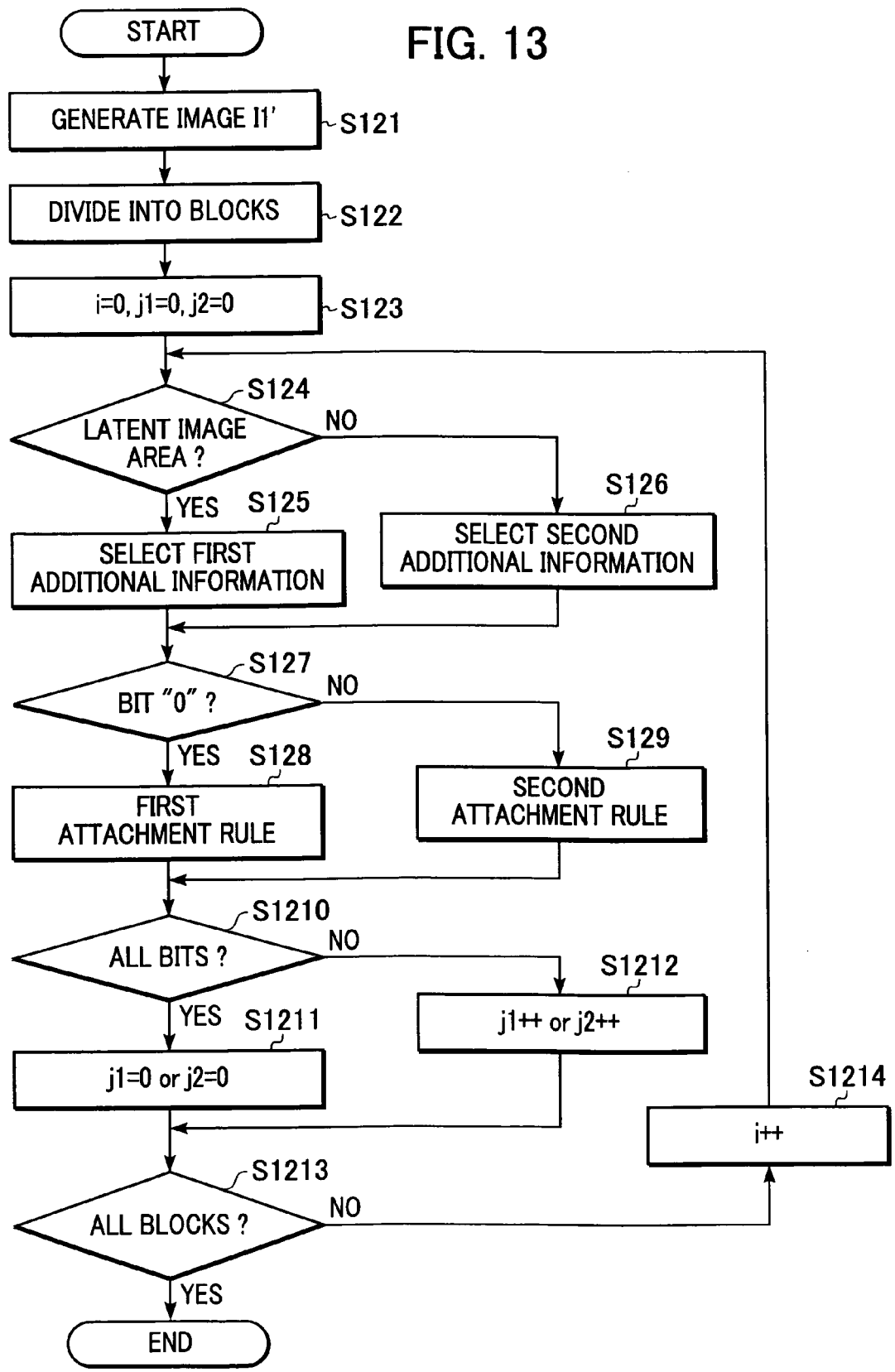

IMAGE-PROCESSING APPARATUS AND METHOD, COMPUTER PROGRAM, AND COMPUTER-READABLE STORAGE MEDIUM FOR DISCOURAGING ILLEGAL COPYING OF IMAGES

BACKGROUND OF THE INVENTION

1. Field of the Invention

The present invention relates to image processing techniques for processing an image including a latent image area and a background area, and pertains to the field of preventing, detecting, and suppressing illegal copying of printed material. More specifically, the present invention relates to a technique for producing printed material which can be distinguished from its copies.

2. Description of the Related Art

In order to suppress illegal copying of important documents such as a resident card, a certified copy of family register, etc. and distinguish originals from copies, specially printed paper called security paper is commonly used.

A sheet of security paper generally has a warning message such as "void copy" printed at a density such that the message can be reproduced with a copy machine and a background at a density such that the background cannot be easily reproduced with a copy machine. The densities of the warning message and the background excluding the warning message are set such that they cannot be distinguished from each other by human eyes. Hereafter, an area which is difficult to reproduce with a copy machine is called a latent image (or a latent image area), an area which is reproducible with a copy machine is called a background (or a background area), and the area including both the latent image and the background is called a ground image. When printed material on which the ground image is recorded is copied, the warning message is clearly shown on the copy.

However, in the case in which the security paper which is specially treated is used as described above, there is a cost problem since the security paper must be prepared in advance. In order to solve this problem, techniques for generating the ground image by software without using the security paper have been proposed. For example, according to Japanese Patent Laid-Open No. 2001-238075, a ground image including a dither pattern whose density is high relative to the resolution of a copy machine which reads the ground image and a dither pattern whose density is low relative to the resolution of the copy machine is generated, and an image obtained by superimposing the generated ground image and output data such as a document image is output.

In both of the cases in which the security paper is used and the ground image is generated by software, a warning message is shown when a copy is made, so that people can determine whether the printed material is a copy. However, systems, machinery and the like cannot determine whether such printed material is a copy.

In addition, although copying can be potentially suppressed by the warning message, it is difficult to essentially prevent copying, and it is also difficult to determine the printer used for outputting printed material, the date and time at which the printed material was outputted, and the user who outputted the printed material.

SUMMARY OF THE INVENTION

In view of the above-described situation, an object of the present invention is to provide a technique by which machines can determine whether printed material is an original or a copy.

In order to attain this object, according to one aspect of the present invention, an image-processing apparatus which processes an image including a latent image area and a background area includes an image generator which generates a new image by expressing the latent image area with dots of a first dot size and the background area with dots of a second dot size which is different from the first dot size and an information-attaching unit which attaches additional information to at least the latent image area of the image generated by the image generator.

In addition, another object of the present invention is to provide a technique for attaching additional information using dots when the ground image is constructed of dots.

In order to attain this object, according to another aspect of the present invention, an image-processing apparatus which processes an image including a latent image area and a background area includes an image generator which generates a new image by expressing the latent image area with dots of a first dot size and the background area with dots of a second dot size which is different from the first dot size and an information-attaching unit which attaches additional information to the latent image area and/or the background area of the image generated by the image generator, and the information-attaching unit controls the position or the size of each of the dots included in the latent image area and/or the background area in accordance with a bit value at the corresponding bit position in the additional information.

Other objects, features and advantages of the invention will become apparent from the following detailed description taken in conjunction with the accompanying drawings.

BRIEF DESCRIPTION OF THE DRAWINGS

FIG. 13 is a flowchart of an information-attaching process performed by an information-attaching unit according to a second embodiment of the present invention.

DETAILED DESCRIPTION OF THE PREFERRED EMBODIMENTS

Embodiments of the present invention will be described below with reference to the accompanying drawings.

First Embodiment

Figure 1:
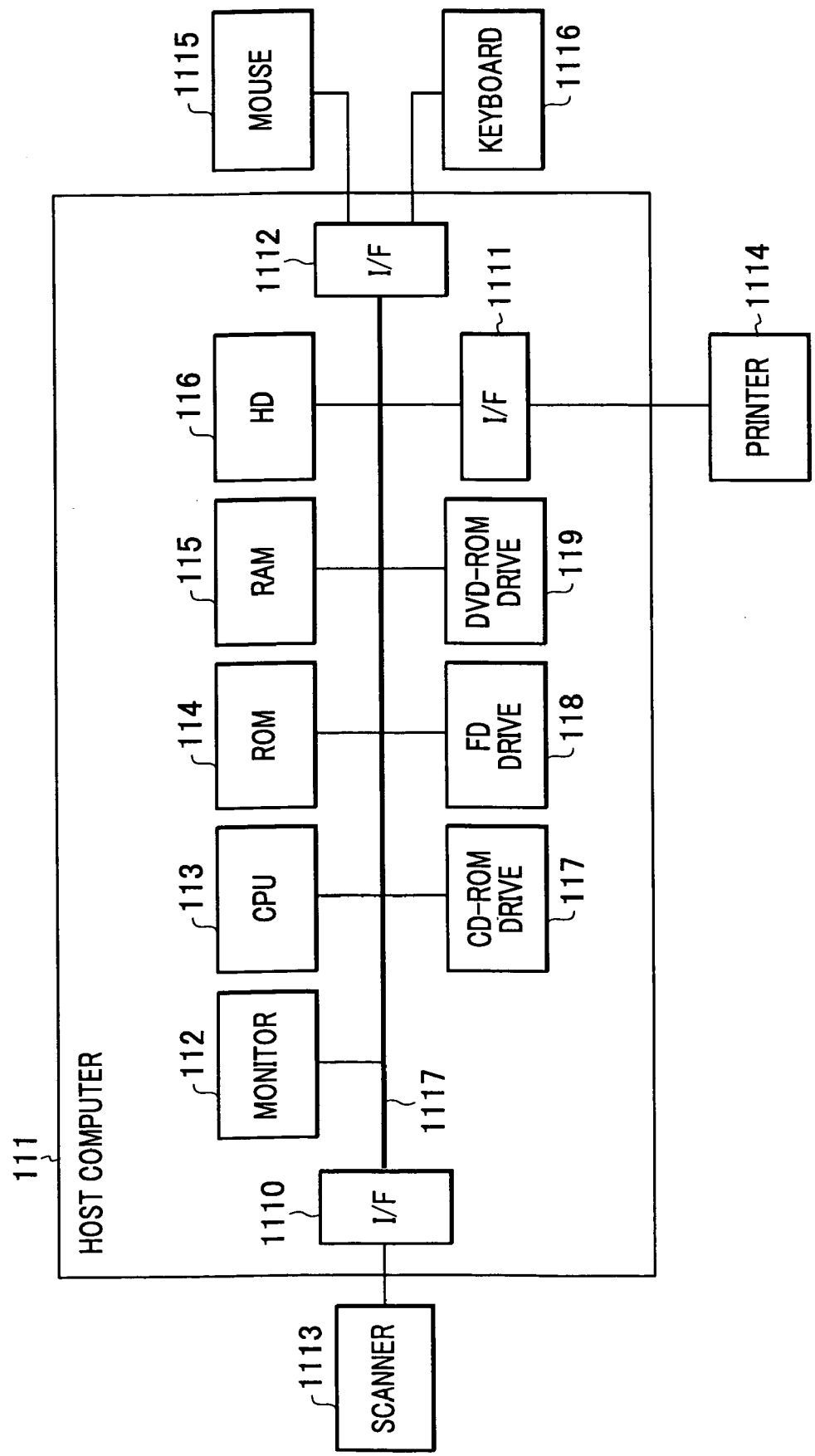
FIG. 1 is a diagram showing the basic construction of a host computer which functions as an image-processing apparatus according to a first embodiment of the present invention and the relationship between the host computer and peripheral devices.

FIG. 1 is a diagram showing the basic construction of a host computer 111 which functions as an image-processing apparatus according to a first embodiment of the present invention and the relationship between the host computer 111 and peripheral devices. In the figure, the host computer 111 is, for example, a common personal computer with which an image read by a scanner 1113 and input to the computer via an interface (I/F) 1110 can be edited and saved. In addition, the image can also be printed by a printer 1114. Various commands from a user are input from a mouse 1115 and a keyboard 1116. In the host computer 111, components described below are connected to one another with a bus 1117 through which various data are communicated.

The host computer 111 includes a monitor 112 which can display various information in the host computer 111; a central processing unit (CPU) 113 which controls the operation of each component of the host computer 111 and executes programs loaded into a random access memory (RAM) 115; a read-only memory (ROM) 114 which stores a basic input/output system (BIOS) and a boot program; and the RAM 115 which temporarily stores programs for processes performed by the CPU 113 and image data being processed. An operation system (OS) and programs for various processes performed by the CPU 113, which will be described below, are loaded into the RAM 115.

The host computer 111 also includes a hard disk (HD) 116 which stores the OS and the programs to be transmitted to the RAM 115 or the like. In addition, while the apparatus is under operation, the image data is stored in and read from the hard disk (HD) 116.

In addition, the host computer 111 also includes a CD-ROM drive 117 which can read and write data to a CD-ROM (CD-R) which serves as an external memory medium; a floppy disc (FD) drive 118 which can read and write data to a FD similar to the CD-ROM drive 117; and a DVD-ROM drive 119 which can read and write data to a DVD-ROM similar to the CD-ROM drive 117. When programs for editing images are stored in the CD-ROM, the FD, the DVD-ROM, etc., these programs are installed in the HD 116 and are transmitted to the RAM 115 as necessary.

The host computer 111 also includes the interface (I/F) 1110 which connects the scanner 1113 and the bus 1117 and outputs the image data input from the scanner 1113 to the HD 116 and the RAM 115.

The host computer 111 also includes another I/F 1111 which connects the host computer 111 to the printer 1114 which prints the image data and character data obtained from the RAM 115, the HD 116, the CD-ROM drive 117, the FD drive 118, the DVD-ROM drive 119, etc., on a recording medium such as a paper sheet and an overhead projector (OHP) film. The host computer 111 outputs print data to the printer 1114 via the I/F 1111.

The host computer 111 also includes another I/F 1112 which connects the host computer 111 to the mouse 1115 and the keyboard 1116, and various commands from the mouse 1115 or the keyboard 1116 are input to the CPU 113 via the I/F 1112.

Figure 2:
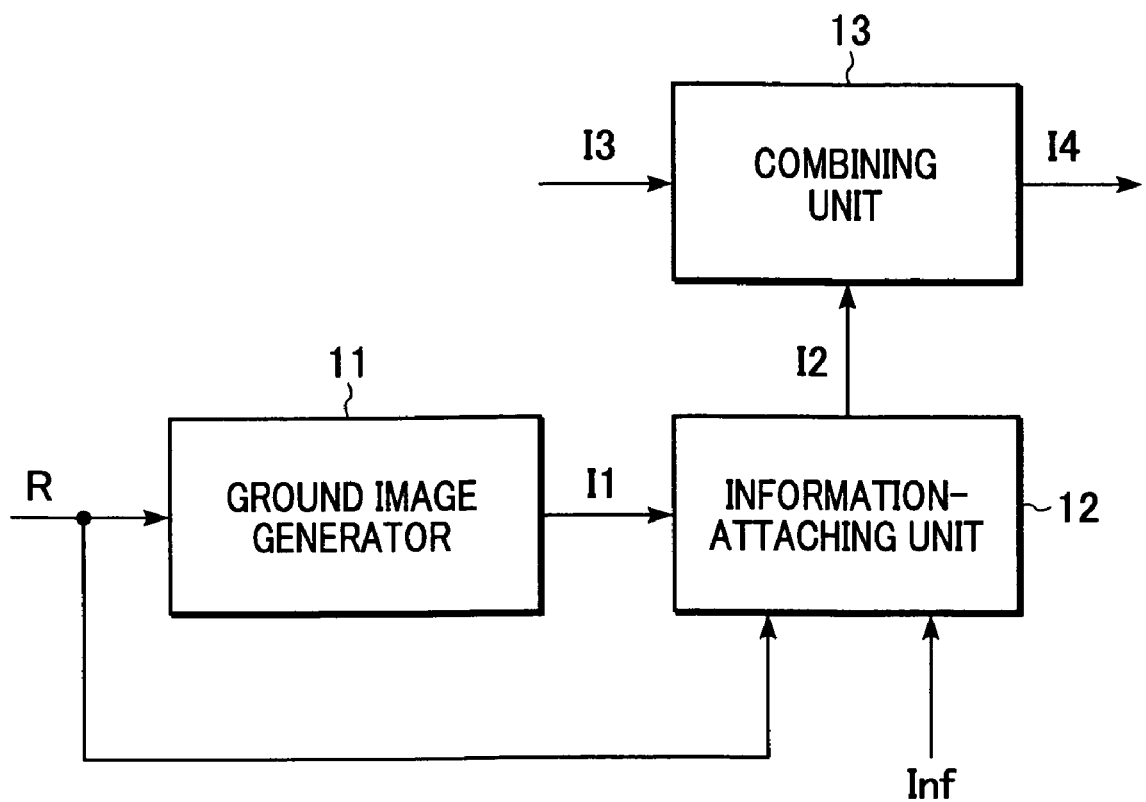
FIG. 2 is a diagram showing the functional structure of the image-processing apparatus according to the first embodiment of the present invention.

FIG. 2 is a diagram showing the functional structure of the image-processing apparatus according to the present embodiment. Although components shown in the figure may be constructed as hardware, they are provided as software in the present embodiment. More specifically, software programs for achieving the functions of the components shown in FIG. 2 are stored in the HD 116, the CD-ROM, the FD, the DVD-ROM, etc. The software programs are loaded into the RAM 115, and the CPU 113 executes them to achieve the functions of the components shown in FIG. 2.

In addition, a data group (additional information and document image) used in processes described below is stored in the above-described memory media or in the HD 116 and is loaded into the RAM 115 as necessary.

First, a process performed by a ground-image generator 11 shown in FIG. 2 will be described below. The ground-image generator 11 receives area-assignment information R from the keyboard 1116 or the mouse 1115, generates a ground image I1 in accordance with the area-assignment information R, and outputs the ground image I1 to an information-attaching unit 12.

The area-assignment information R defines a first area (hereinafter called a latent image area) which is deleted when it is copied and a second area (hereinafter called a background area) which is not deleted when it is copied. The area-assignment information R may be a binary image in which the latent image area is represented by bit "1" and the background area is represented by bit "0". An example of the area-assignment information R is shown in FIG. 3A.

Figure 3A:
FIG. 3A is a diagram showing a binary image defined by area-assignment information R in the case in which a character string "void copy" is set to be shown on copies.

FIG. 3A is a diagram showing a binary image defined by the area-assignment information R in the case in which a character string "void copy" is set to be shown on copies. In FIG. 3A, an area 31 is assigned to be the latent image area and an area 32 is assigned to be the background area. The area-assignment information R may be generated by, for example, converting a character string input by the user from the keyboard 1116 or the mouse 1115 into a binary image with an adequate font. However, the area-assignment information R is not limited to characters, and various kinds of marks may also be set as the area-assignment information R.

Figure 4:
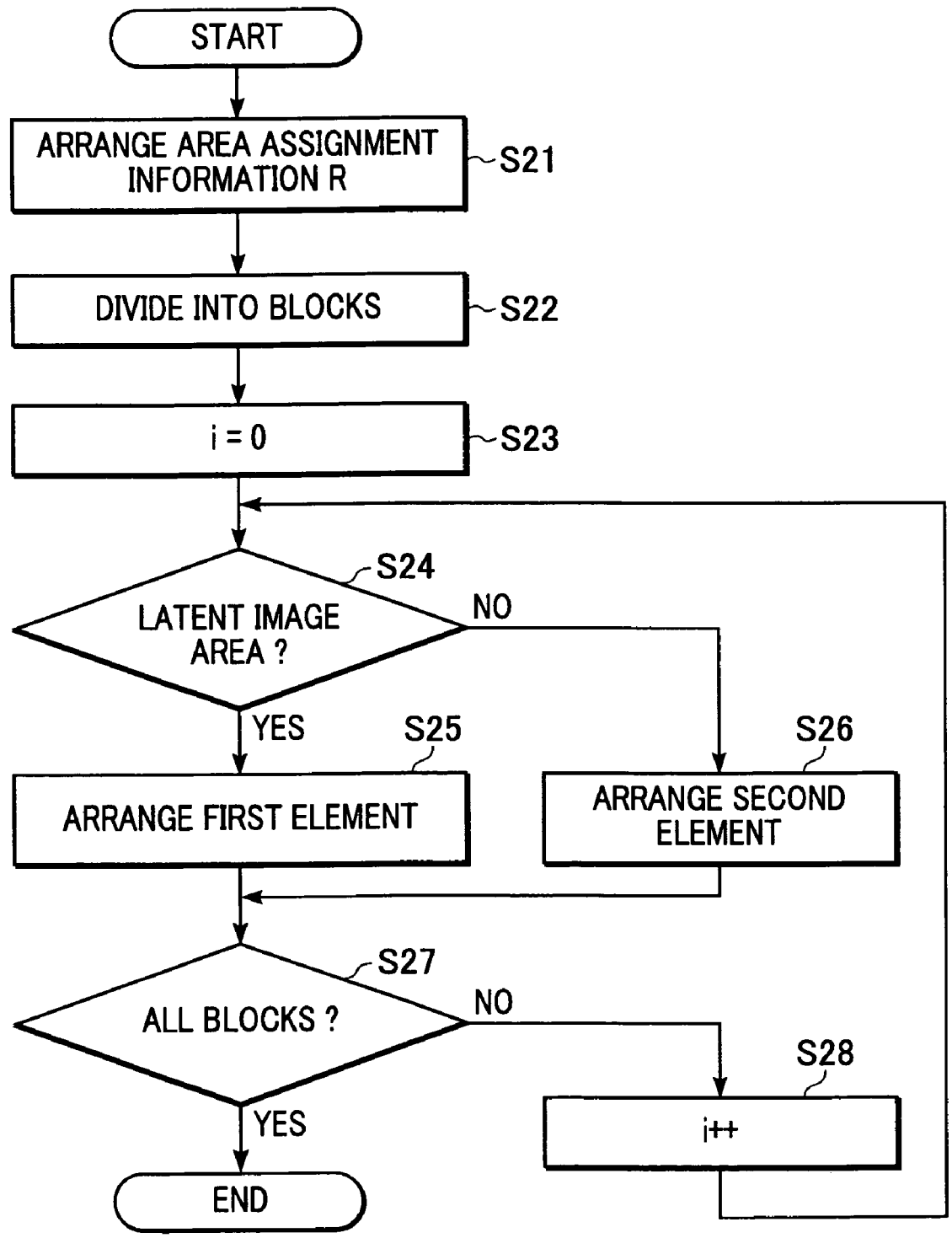
FIG. 4 is a flowchart of a ground-image-generating process according to the first embodiment of the present invention.

A ground-image-generating process executed by the ground-image generator 11 will be described below with reference to FIG. 4. FIG. 4 is a flowchart of the ground-image-generating process according to the present embodiment.

First, in Step 21, a memory area large enough for the size of the ground image I1 to be generated is provided in the RAM 115 and the ground image I1 is generated by designating the area-assignment information R to the memory area provided in the RAM 115. More specifically, the ground image I1 is generated by arranging the area-assignment information R in the memory area.

Figure 3B:
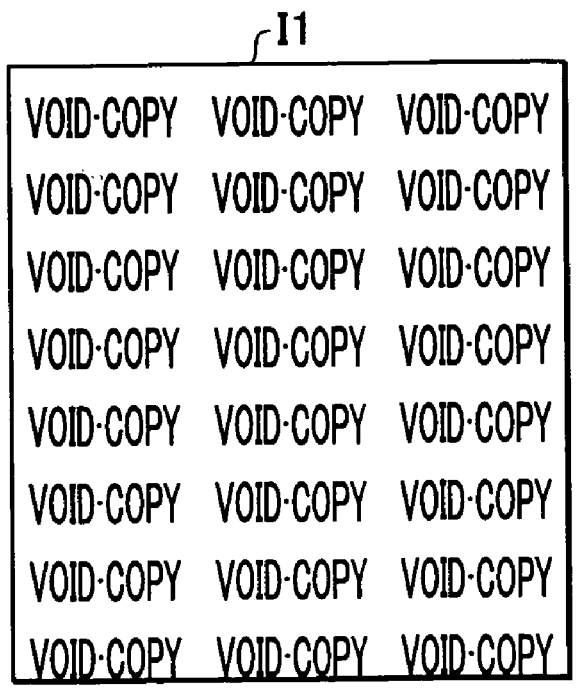
FIG. 3B is a diagram showing a ground image I1 obtained when the area-assignment information R shown in FIG. 3A is repeated over the entire area thereof.
Figure 3C:
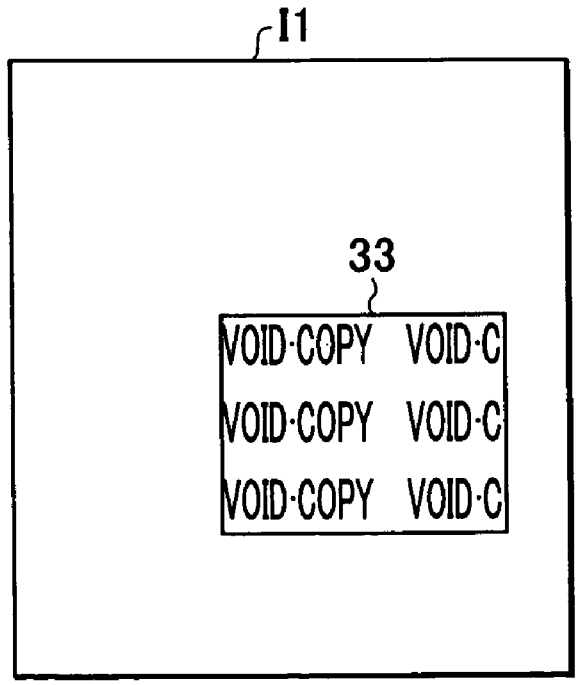
FIG. 3C is a diagram showing the ground image I1 obtained when the area-assignment information R shown in FIG. 3A is arranged only in a predetermined area thereof.

When the size of the provided area, that is, the size of the ground image I1 to be generated is larger than that of the area-assignment information R, the area-assignment information R may be repeated in the ground image I1. FIG. 3B is a diagram showing the ground image I1 obtained when the area-assignment information R shown in FIG. 3A is repeated over the entire area thereof. The area-assignment information R may also be arranged only in a predetermined area in the ground image I1. FIG. 3C is a diagram showing the ground image I1 obtained when the area-assignment information R shown in FIG. 3A is arranged only in a predetermined area 33 thereof.

In the following description of the area-assignment information R, the pixel value of pixels belonging to the latent image area is defined as 1 and the pixel value of pixels belonging to the background area is defined as 0. However, the present invention is not limited to this.

Next, in Step 22, the ground image I1 generated in Step 21 is divided into a plurality of blocks which do not overlap one another.

Then, in Step 23, a parameter i is initialized to 0. The parameter i is an index for each of the blocks divided in Step 22.

In Step 24, it is determined whether the $i^{th}$ block in the ground image I1 generated in Step 21 is set as the latent image area or the background area. More specifically, it is determined whether the $i^{th}$ block belongs to the latent image area or the background area.

In order to determine the area to which the $i^{th}$ block belongs, the area-assignment information R designated in Step 21 is used. When the corresponding bit in the area-assignment information R is "1", it is determined that the $i^{th}$ block belongs to the latent image area. When the corresponding bit in the area-assignment information R is "0", it is determined that the $i^{th}$ block belongs to the background area.

The process proceeds to Step 25 when it is determined that the $i^{th}$ block belongs to the latent image area, and to Step 26 when it is determined that the $i^{th}$ block belongs to the background area.

When it is determined that the $i^{th}$ block belongs to the latent image area, a first basic element (hereinafter called a latent-image element) which is deleted when it is copied is arranged on the $i^{th}$ block in Step 25. When it is determined that the $i^{th}$ block belongs to the background area, a second basic element (hereinafter called a background element) which is not deleted when it is copied is arranged on the $i^{th}$ block in Step 26.

Figure 5A:
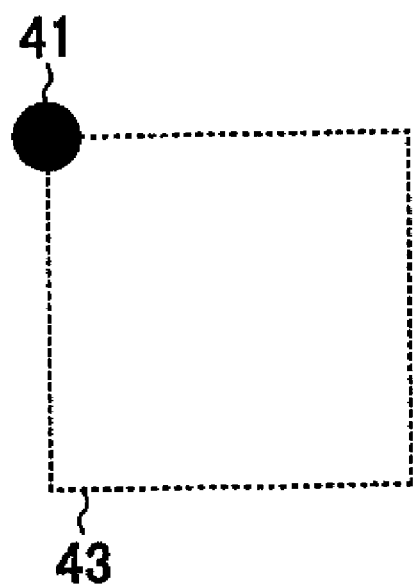
FIG. 5A is a diagram showing an example of a background element used in the first embodiment of the present invention.

The latent-image element and the background element used in Steps 25 and 26, respectively, will be described in detail below with reference to FIGS. 5A to 5D. FIG. 5A is a diagram showing an example of a background element used in the present embodiment, and FIG. 5B is a diagram showing an example of a latent-image element used in the present embodiment.

In FIG. 5A, the rectangle 43 corresponds to a single block which belongs to the background area, and a large dot 41 is arranged on the rectangle 43. In FIG. 5B, the rectangle 44 corresponds to a single block which belongs to the latent image area, and small dots 42a to 42d are arranged on the corners of one of four rectangles obtained by equally dividing the rectangle 44.

Accordingly, the size of each dot included in the latent image area is smaller than that of each dot included in the background area, and intervals between the dots in the latent image area are smaller than intervals between the dots in the background area.

Figure 5B:
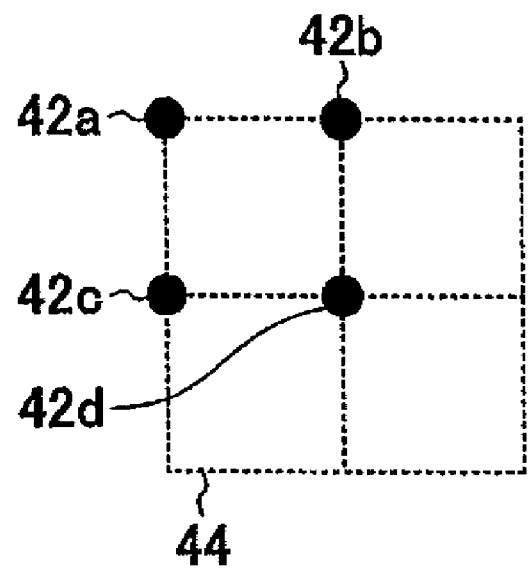
FIG. 5B is a diagram showing an example of a latent-image element used in the first embodiment of the present invention.
Figure 5C:
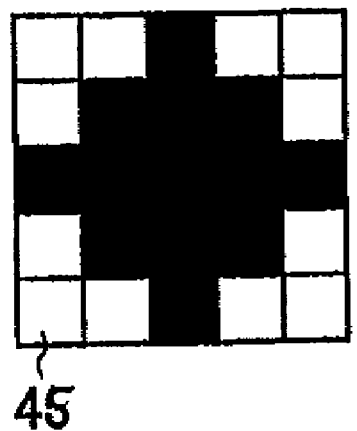
FIG. 5C is a diagram showing the construction of a large dot.
Figure 5D:
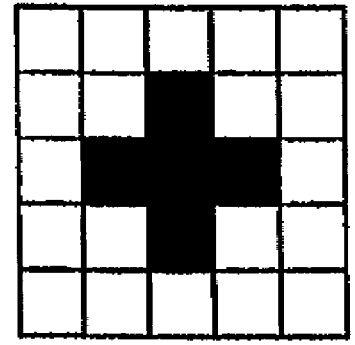
FIG. 5D is a diagram showing the construction of a small dot.

The large dot 41 and each of the small dots 42a to 42d are constructed as shown in FIGS. 5A and 5B, respectively. In FIGS. 5C and 5D, each rectangle 45 corresponds to a single pixel in the ground image I1. Accordingly, the large dot 41 and each of the small dots 42a to 42d are constructed by a plurality of pixels.

Although the latent-image element and the background element shown in FIGS. 5A to 5D have different constructions, they are constructed such that the densities of the latent-image element and the background element are the same when they are printed on a paper sheet. Ideally, the densities of the latent-image element and the background element are the same when the same number of black pixels are included the latent-image element and the background element. However, even when the latent-image element and the background element have the same number of black pixels, the densities thereof may differ depending on the characteristics of a printer used for printing, toner or ink, the paper sheet, etc. Accordingly, test printing of the latent-image element and the background element may be performed first and an adjustment may be made such that the densities of the latent-image element and the background element look the same to human eyes.

With reference to FIGS. 5A to 5D, the latent-image element is constructed such that it is deleted when it is copied and the background element is constructed such that it is not deleted when it is copied. When the latent-image element is constructed of small dots as shown in FIGS. 5B and 5D, the latent-image element is easily deleted since small dots cannot be easily reproduced by a copy machine. In addition, when the background element constructed of a large dot as shown in FIGS. 5A and 5C, the background element is not easily deleted since large dots can easily reproduced by a copy machine. Accordingly, test copying of a paper sheet on which the latent-image element and the background element are printed may be performed first and an adjustment may be made such that the latent-image element is easily deleted and the background element is not easily deleted.

With reference to FIG. 4 again, in Step 27, it is determined whether or not all of the blocks are processed. The determination is performed by, for example, deciding whether or not the parameter i has reached the total number of blocks. When it is determined that all of the blocks are processed, the ground-image-generating process is finished. When it is determined that not all of the blocks are processed, the process proceeds to Step 28 and the parameter i is incremented by 1. Then, Step 24 and the following steps are performed again.

Figure 6A:
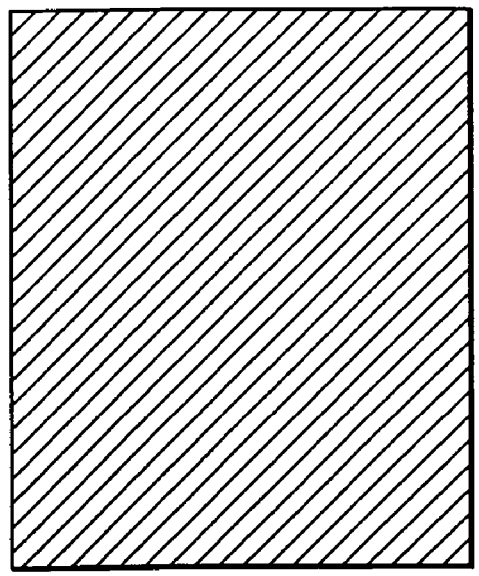
FIG. 6A is a diagram showing the entire area of the ground image I1.
Figure 6B:
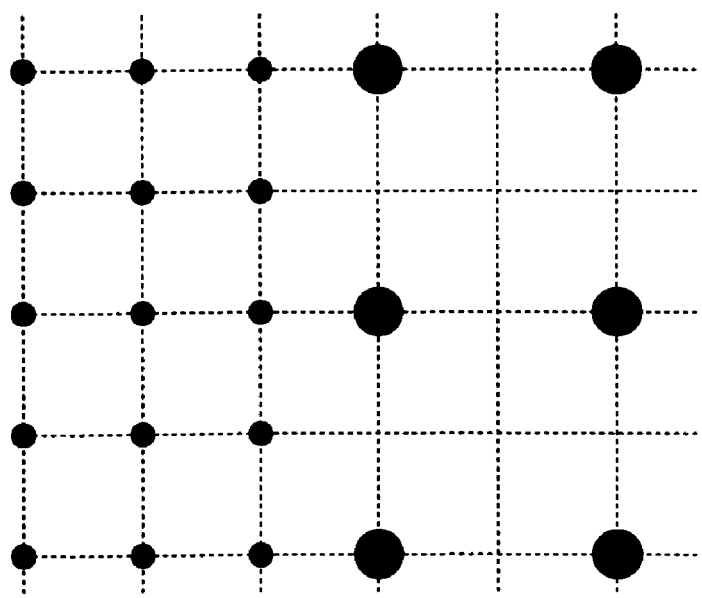
FIG. 6B is an enlarged view showing the boundary region between a latent image area and a background area in the ground image I1 shown in FIG. 6A.

An example of the ground image I1 generated in accordance with the flowchart of FIG. 4 is shown in FIGS. 6A and 6B. FIG. 6A is a diagram showing the entire area of the ground image I1 and FIG. 6B is a diagram showing the boundary region between the latent image area and the background area in the ground image I1 shown in FIG. 6A. As shown in FIG. 6B, the background area and the latent image area have different constructions. However, as shown in FIG. 6A, since the background elements and the latent-image elements are set such that they are printed at the same density, it is difficult to distinguish between the background area and the latent image area and the ground image I1 looks like an image of a constant density when the entire area of the image is viewed by human eyes.

Next, a process performed by the information-attaching unit 12 shown in FIG. 2 will be described below. The information-attaching unit 12 receives the ground image I1 generated by the ground-image generator 11, the area-assignment information R, and additional information Inf, generates the image I2 by attaching the additional information Inf to the ground image I1 in accordance with the area-assignment information R, and outputs the image I2 including the additional information Inf.

The additional information Inf is loaded into the RAM 115 from the above-described memory media or the HD 116. However, the present invention is not limited to this, and the additional information Inf may also by input by the user from the keyboard 1116 or the mouse 1115. In the present embodiment, information showing that printed material is the original is used as the additional information. However, the present invention is also not limited to this.

Figure 7:
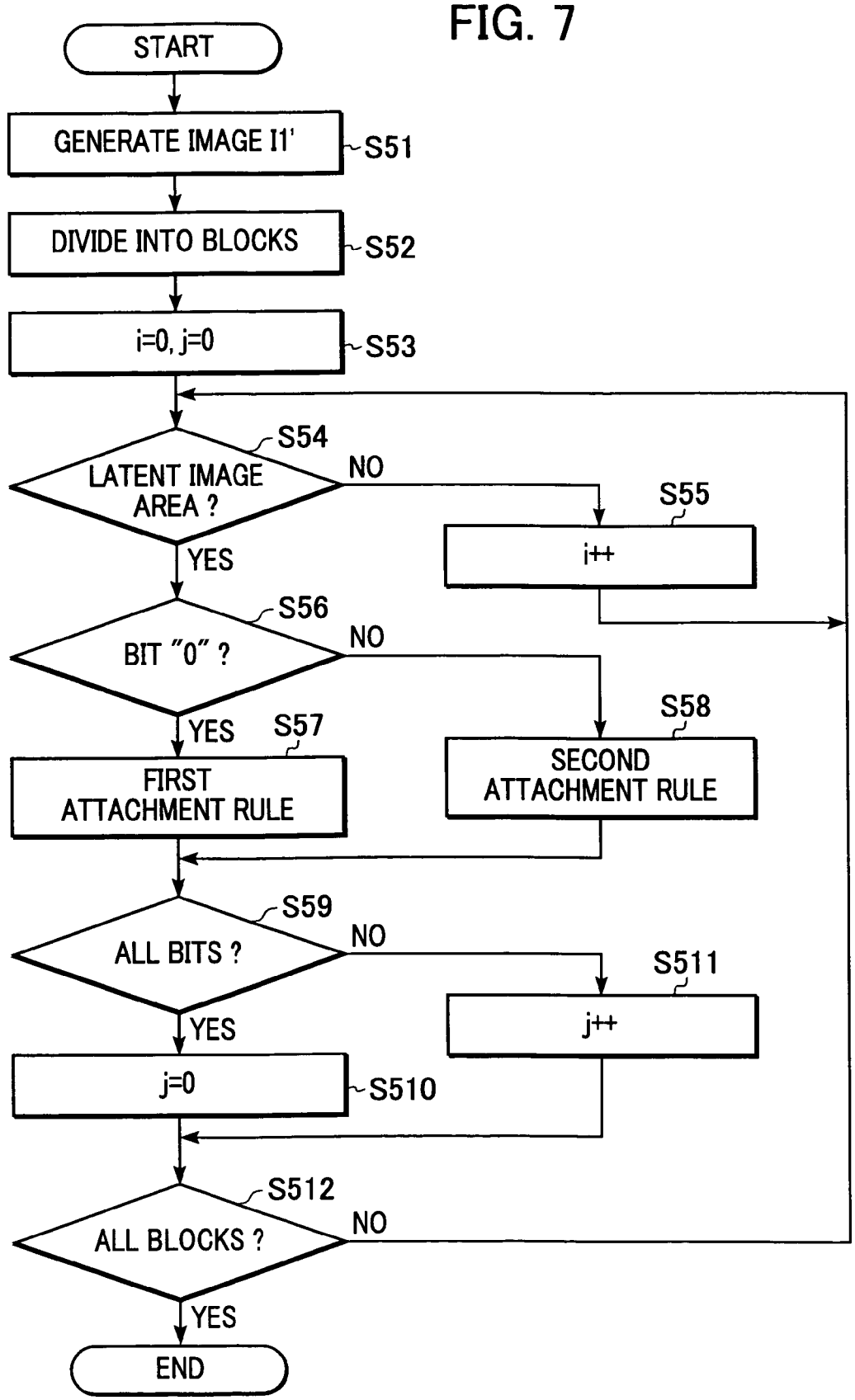
FIG. 7 is a flowchart of an information-attaching process according to the first embodiment of the present invention.

Next, an information-attaching process performed by the information-attaching unit 12 will be described below with reference to FIG. 7. FIG. 7 is a flowchart showing the information-attaching process according to the present embodiment.

First, similar to the above-described Step 21, a ground image I1' is generated by arranging the area-assignment information R in a memory area of the RAM 115 in Step 51. Then, similar to Step 22, each of the images I1 and I1' is divided into a plurality of blocks in Step 52.

Then, in Step 53, parameters i and j are initialized to 0. The parameter i is an index for each of the blocks divided in Step 52 and the parameter j is an index showing a bit position in the additional information Inf.

Then, in Step 54, it is determined whether the $i^{th}$ block in the image I1 belongs to the latent image area or the background area.

In order to determine the area to which the $i^{th}$ block belongs, the area-assignment information R designated in Step 21 is used. When the corresponding bit in the area-assignment information R is "1", it is determined that the $i^{th}$ block belongs to the latent image area. When the corresponding bit in the area-assignment information R is "0", it is determined that the $i^{th}$ block belongs to the background area.

Whether the $i^{th}$ block in the image I1 belongs to the latent image area or the background area can be determined on the basis of the determination result of whether the $i^{th}$ block in the image I1' belongs to the latent image area or the background area.

The process proceeds to Step 56 when it is determined that the $i^{th}$ block in the image I1 belongs to the latent image area, and to Step 55 when it is determined that the $i^{th}$ block in the image I1 belongs to the background area.

In the present embodiment, among all the blocks, the additional information Inf is attached only to the blocks which belong to the latent image area, and is not attached to the blocks which belong to the background area. Therefore, when it is determined that the $i^{th}$ block belongs to the background area, the index i is incremented by 1 in Step 55, and the process returns to Step 54. Then, it is determined whether the $(i+1)^{th}$ block belongs to the latent image area or the background area.

When it is determined that the $i^{th}$ block belongs to the latent image area, the additional information Inf is referred to and it is determined whether the $i^{th}$ bit of the additional information Inf is "0" or "1" in Step 56. The process proceeds to Step 57 when the $j^{th}$ bit is "0" and to Step 58 when the $j^{th}$ bit is "1".

When the $j^{th}$ bit is "0", each of the dots included in the $i^{th}$ block is moved in accordance with a predetermined first information-attachment rule. When the $j^{th}$ bit is "1", each of the dots included in the $i^{th}$ block is moved in accordance with a predetermined second information-attachment rule.

Figure 8A:
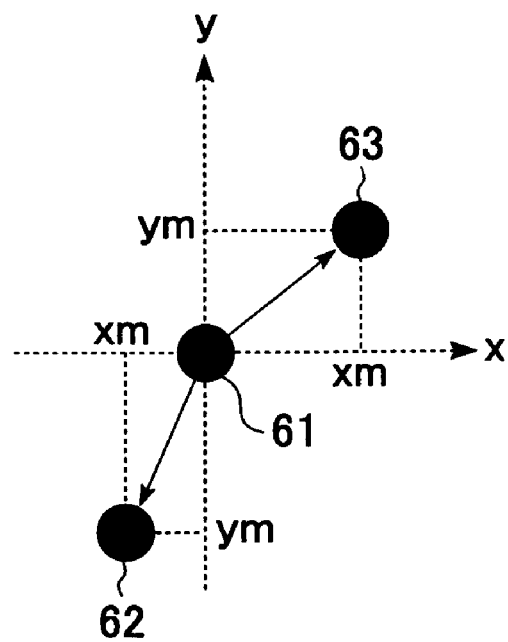
FIG. 8A is a diagram showing a first information-attachment rule used in the first embodiment of the present invention.

The information-attachment rules used in Steps 57 and 58 will be described below with reference to FIGS. 8A and 8B. FIG. 8A shows the first information-attachment rule used in the present embodiment and FIG. 8B shows the second information-attachment rule used in the present embodiment.

Figure 8B:
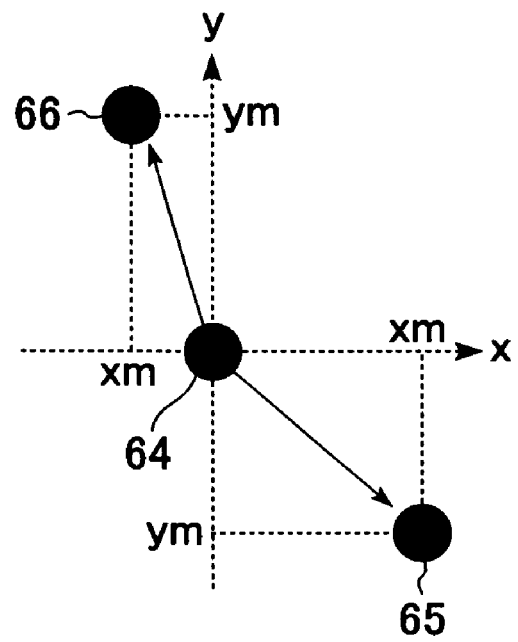
FIG. 8B is a diagram showing a second information-attachment rule used in the first embodiment of the present invention.

In FIGS. 8A and 8B, reference numerals 61 and 64 show dots arranged in the image I1 by the ground-image generator 11. In the present embodiment, the dots 61 and 64 are moved in accordance with predetermined rules in order to attach the additional information to the latent image area.

As shown in FIG. 8A, according to the first information-attachment rule, when the displacement of the dot is represented by a vector (xm, ym), the signs of xm and ym are determined such that the sign of xm×ym is positive. More specifically, as shown in the figure, if the dot 61 is positioned at the origin and x and y axes are defined such that they intersect orthogonally at the origin, the dot 61 is moved such that xm and ym are either both positive or both negative when the first information-attachment rule is applied. In the figure, reference numerals 62 and 63 show positions to which the dot 61 can be moved when the first information-attachment rule is applied.

On the contrary, as shown in FIG. 8B, according to the second information-attachment rule, the signs of xm and ym which represent the displacement of the dot are determined such that the sign of xm×ym is negative. More specifically, as shown in the figure, when the dot 64 is positioned at the origin and x and y axes are defined such that they intersect orthogonally at the origin, the dot 64 is moved such that one of xm and ym is positive and the other one is negative when the second information-attachment rule is applied. In the figure, reference numerals 65 and 66 show positions to which the dot 64 can be moved when the second information-attachment rule is applied.

When the interval between the adjacent dots is L, values of |xm| and |ym| are determined such that they satisfy 0<|xm|<L/2 and 0<|ym|<L/2 using pseudo-random numbers generated by adequate initial values.

The above ranges are set because it becomes difficult to determine the original positions of the dots when they are displaced beyond these ranges. Accordingly, when the displacements of the dots are limited within the above-described ranges, the information attached to each dot can be obtained on the basis of the direction in which the dot is displaced without being affected by the adjacent dots.

With reference to FIG. 7 again, in Step 59, it is determined whether or not all of the bits of the additional information Inf are attached. When it is determined that all of the bits are attached, the process proceeds to Step 510. When it is determined that not all of the bits are attached, the process proceeds to Step 511.

In Step 510, the index j which shows the bit position in the additional information Inf is initialized to 0 and the process proceeds to Step 512.

In Step 511, the index j which shows the bit position in the additional information Inf is incremented by 1, and the process proceeds to Step 512.

In Step 512, it is determined whether or not all of the blocks are processed. The determination is performed by, for example, deciding whether or not the parameter i has reached the total number of blocks. When it is determined that all of the blocks are processed, the information-attaching process is finished. When it is determined that not all of the blocks are processed, the process proceeds to Step 55 and the parameter i is incremented by 1. Then, Step 54 and the following steps are performed again.

Figure 9A:
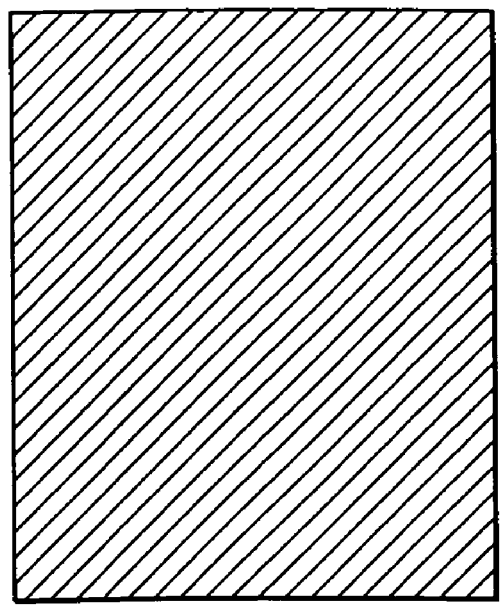
FIG. 9A is a diagram showing the entire area of an image I2.
Figure 9B:
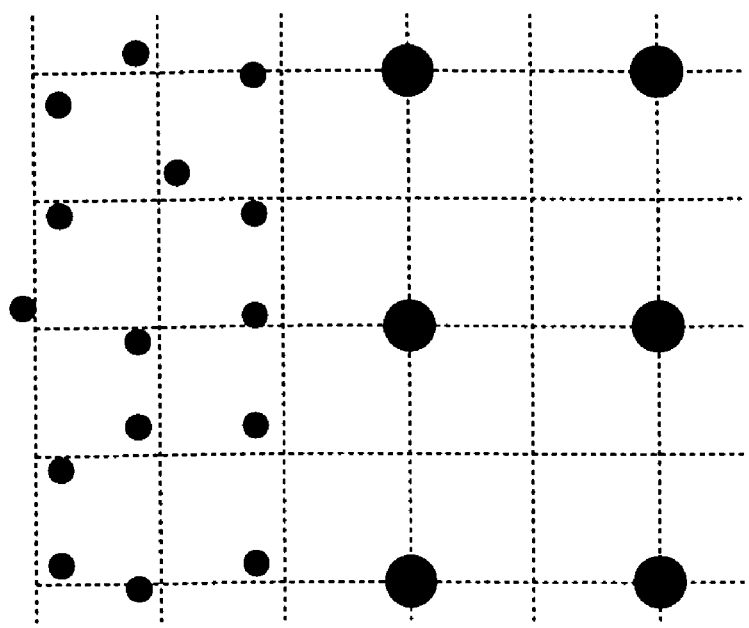
FIG. 9B is an enlarged view showing the boundary region between the latent image area and the background area in the image I2 shown in FIG. 9A.

An example of the image I2 generated in accordance with the flowchart of FIG. 7 is shown in FIGS. 9A and 9B. FIG. 9A is a diagram showing the entire area of the image I2 and FIG. 9B is an enlarged view showing the boundary region between the latent image area and the background area in the image I2 shown in FIG. 9A. As shown in FIG. 9A, the image I2 looks similar to the ground image I1 (the image I2 may actually look a little rough since the small dots in the latent image area of the image I2 are arranged irregularly whereas the small dots in the latent image area of the ground image I1 are arranged regularly). However, as shown in FIG. 9B, small dots in the latent image area are distributed randomly since the additional information Inf is attached.

Next, a process performed by a combining unit 13 shown in FIG. 2 will be described below. The combining unit 13 receives the document image I3 and the image I2 generated by the information-attaching unit 12, combines the document image I3 and the image I2, and outputs the composite image I4. The composite image I4 is converted into print data by a printer driver installed in the HD 116, is output to the printer 1114 via the I/F 1111, and is recorded on the recording medium such as a paper sheet and an OHP film.

Figure 10A:
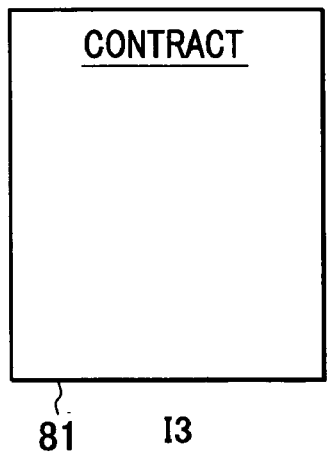
FIGS. 10A to 10C are diagrams showing a document image I3, the image I2, and a composite image I4, respectively.
Figure 10B:
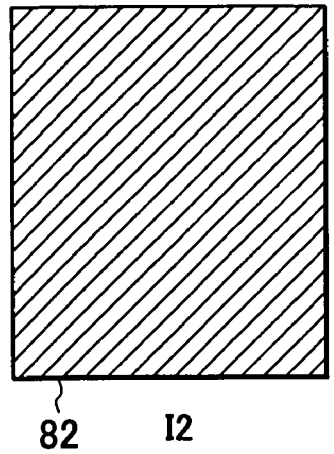
Figure 10C:
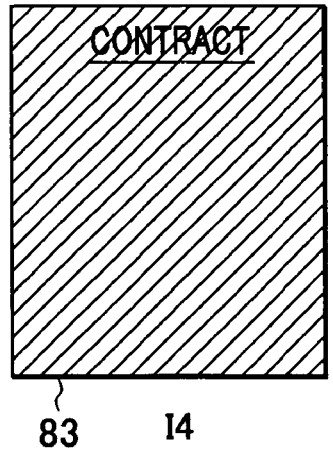

A combining process performed by the combining unit 13 will be described below with reference to FIGS. 10A to 10C. FIGS. 10A to 10C are diagrams showing the document image I3, the image I2, and the composite image I4, respectively.

In FIGS. 10A to 10C, reference numerals 81 to 83 denote the document image I3, the image I2, and the composite image I4, respectively. With reference to FIGS. 10A to 10C, the combining process is performed such that the composite image I4 is generated as the logical sum of the document image I3 and the image I2. However, the method for generating the composite image I4 from the document image I3 and the image I2 is not limited to this, and other methods may also be used. For example, the composite image I4 may also be generated by using the image I2 as an underlying image and superimposing the document image I3 on the underlying image.

Figures 11A, 11B:
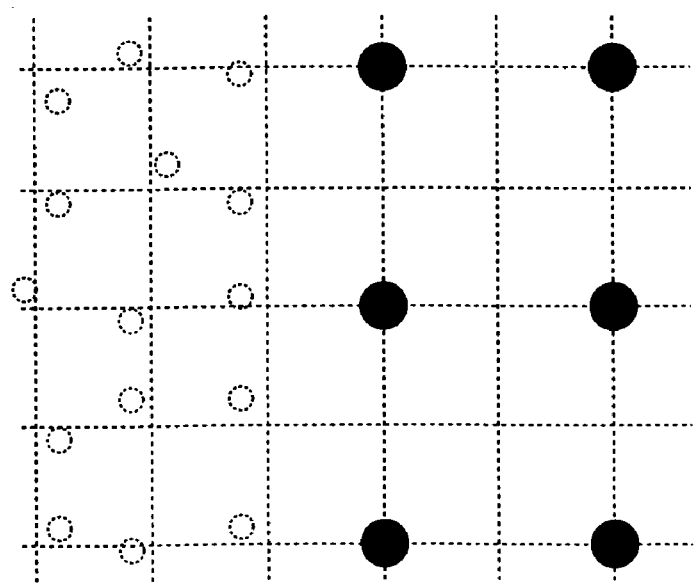
FIG. 11A is a diagram showing an image recorded on a recording medium when the composite image I4 is copied with a common copy machine.
FIG. 11B is an enlarged view showing the boundary region between the latent image area and the background area in the image recorded on the recording medium.

When the composite image I4 generated by the above-described process is copied on a recording medium using a common copy machine or the like, an image formed on the recording medium looks as shown in FIGS. 11A and 11B. FIG. 11A is a diagram showing the image recorded on the recording medium when the composite image I4 is copied with a common copy machine.

As shown in FIG. 11A, when the composite image I4 is copied, regions belonging to the latent image area are clearly shown as a white pattern in the image. This is because the latent image area is constructed of small dots which are deleted when they are copied and the background area is constructed of large dots which are not deleted when they are copied, as shown in FIG. 11B.

Accordingly, when the composite image I4 generated by the above-described image-processing apparatus is copied on a recording medium, it can be easily determined that it is a copy by human eyes.

Next, a method for reading the additional information from the composite image I4 will be described below. In the present embodiment, the additional information is attached by moving the dots as shown in FIGS. 8A and 8B. Accordingly, the additional information can be read by determining the direction to which each dot is displaced from its original position.

Figure 12:
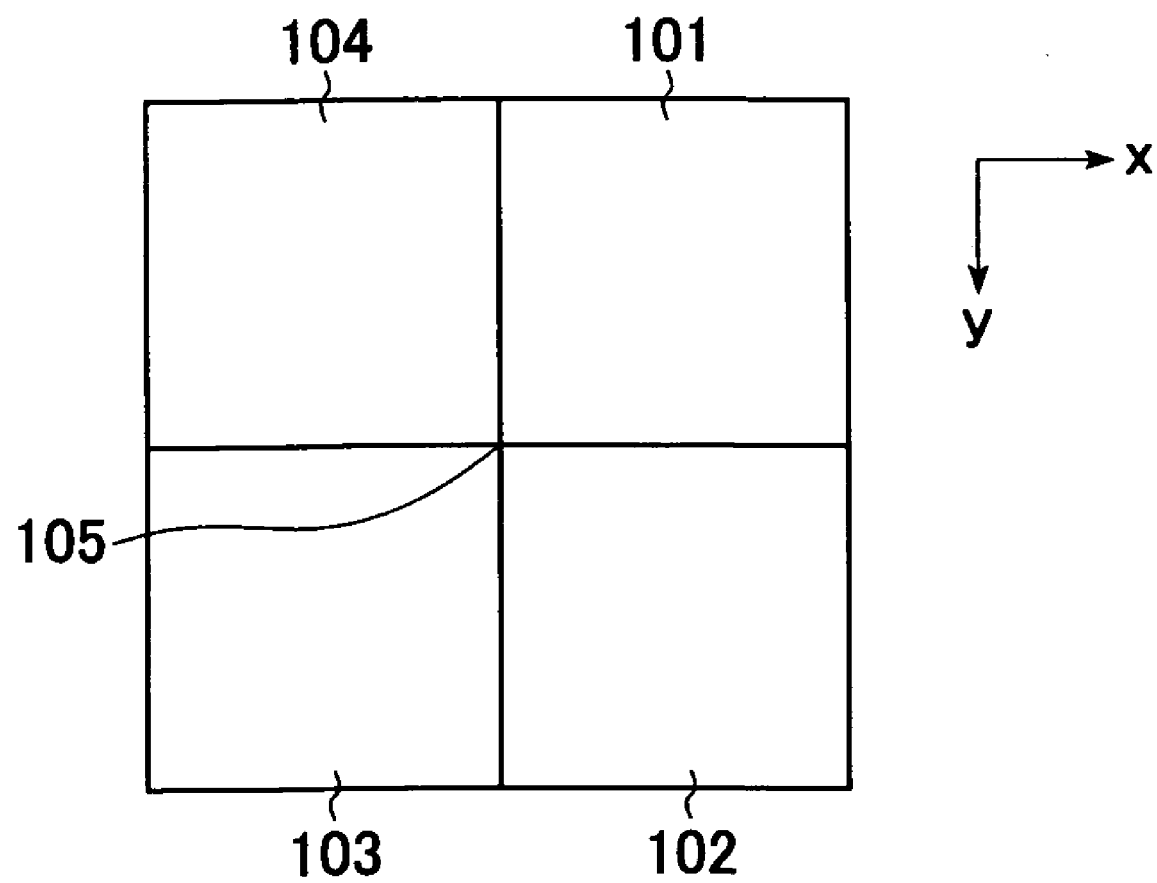
FIG. 12 a diagram for explaining a method of reading information attached to the latent image area.

A method of reading the additional information according to the present embodiment will be described below with reference to FIG. 12. FIG. 12 is a diagram for explaining a method of reading the information attached to the latent image area.

In FIG. 12, reference numeral 105 denotes a position corresponding to the small dots 61 and 64 shown in FIGS. 8A and 8B, respectively. When the position of the upper left corner of the composite image I4 is represented by x=0 and y=0, the x coordinate and the y coordinate of the position 105 can be expressed as multiples of the dimensions of the blocks in the x-axis direction and the y-axis direction, respectively.

Reference numerals 101, 102, 103, and 104 denote regions to which the dot may be displaced when the additional information is attached. The dimensions of each region in the x-axis direction and the y-axis direction are L/2 when the interval between the adjacent dots is L.

According to the above-described information-attachment rules, it is determined that the additional information is bit "0" when the dot is in either the region 101 or the region 103 and that the additional information is bit "1" when the dot is in either the region 102 or the region 104.

In order to determine the region where the dot is positioned, the densities of the regions 101, 102, 103, and 104 are calculated and the region with the highest density is determined as the region where the dot is positioned.

In the present embodiment, the additional information Inf is attached only to the latent image area, and the latent image area is constructed of small dots which are deleted when they are copied. Thus, according to the present embodiment, the additional information can be read correctly from the original on which the composite image I4 is recorded (printed material which is not a copy) but cannot be read correctly from a copy thereof (printed material obtained by copying the original). Therefore, it can be determined whether printed material is an original or a copy by using the information showing that printed material is the original as the additional information.

A device for determining whether printed material is an original or a copy according to the present embodiment will be described below with reference to FIG. 19. Although components shown in the figure may be constructed as hardware, they are provided as software in the present embodiment. More specifically, software programs for achieving the functions of the components shown in FIG. 2 are stored in the HD 116, the CD-ROM 117, the FD 118, the DVD-ROM 119, etc. The software programs are loaded into the RAM 115, and the CPU 113 executes them to achieve the functions of the components shown in FIG. 2.

Figure 19:
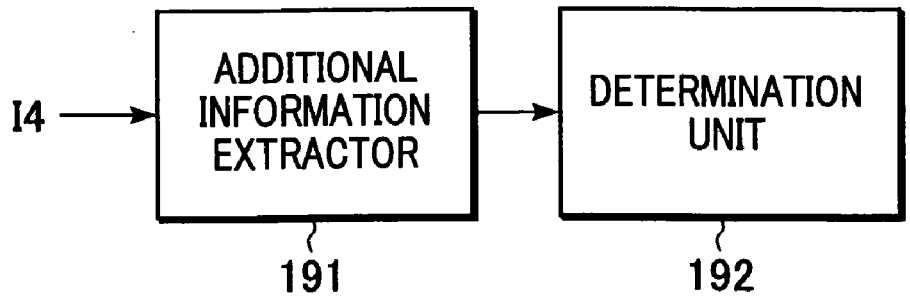
FIG. 19 is a diagram showing a device for determining whether printed material is an original or a copy according to the first embodiment of the present invention.

As shown in FIG. 19, the device for determining whether the printed material is an original or a copy according to the present embodiment includes an additional-information extractor 191 and a determination unit 192.

The additional-information extractor 191 receives image data I4 obtained by scanning the printed material which is to be checked whether it is an original or a copy, extracts the additional information from the image data I4, and outputs the extracted information to the determination unit 192.

In the present embodiment, the extracted information is the information showing that the printed material is the original if the printed material is the original, and the information showing that the printed material is the original is not extracted if the printed material is a copy. When the printed material is a copy, information such as "NULL", which means that the additional information could not be extracted, may be output to the determination unit 192.

Then, the determination unit 192 receives the extracted information, and determines whether the printed material is an original or a copy in accordance with the extracted information.

Figure 20:
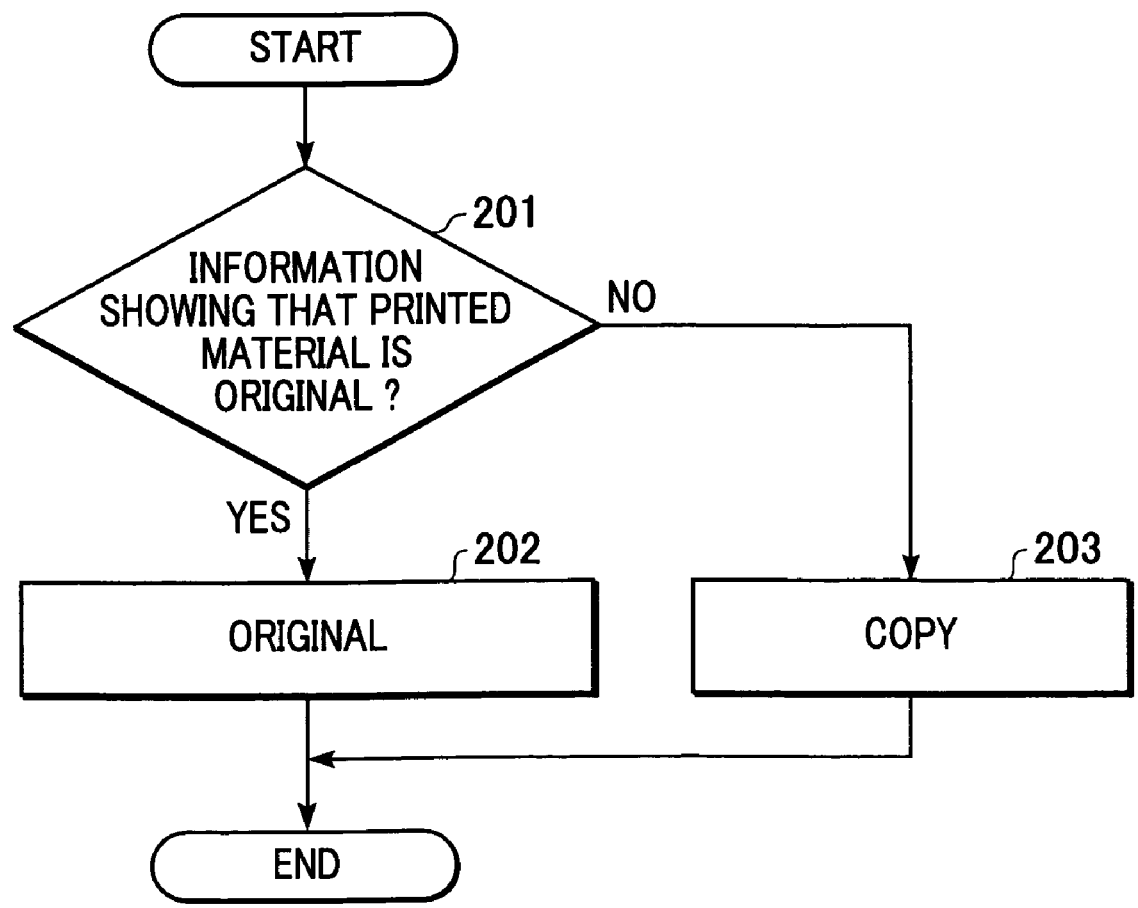
FIG. 20 is a flowchart of a process of determining whether printed material is an original or a copy according to the first embodiment of the present invention.

Next, a process of determining whether the printed material is an original or a copy which is performed by the determination unit 192 will be described with reference to FIG. 20. FIG. 20 is a flowchart of the process of determining whether the printed material is an original or a copy according to the present embodiment.

With reference to the flowchart of FIG. 20, first, it is determined whether or not the extracted information is the information showing that the printed material is the original in Step 201. If the extracted information is the information showing that the printed material is the original, it is determined that the printed material is an original in Step 202, and if the extracted information is not the information showing that the printed material is the original, it is determined that the printed material is a copy in Step 203.

The information showing that printed material is the original may be represented, for example, by a bit string which is set randomly in advance. In such a case, the bit string is stored in both the information-attaching unit and an information-reading unit in advance. For example, the bit string may be stored in the ROM 114 or the HD 116 of each unit. Alternatively, the additional information Inf may also be transmitted via a network. The information-attaching unit attaches the additional information Inf to the image, and the information-reading unit reads the additional information Inf from the image and compares the additional information Inf read from the image with the additional information Inf (authentication information) stored in the ROM 114 or the HD 116. It is determined that the printed material is an original when they are the same and that the printed material is a copy when they are different.

Alternatively, the information showing that printed material is the original may also be information corresponding to the image I4 shown in FIG. 2. In such a case, the information-attaching unit generates the information corresponding to the image I4 on the basis of the image I4 and attaches the generated information to the image as the additional information Inf. The information-reading unit similarly generates the information corresponding to the image I4 on the basis of the image I4, extracts the additional information Inf from the image, and compares the generated information with the extracted information. It is determined that the printed material is an original when they are the same and that it is a copy when they are different.

The information corresponding to the image I4 may be, for example, a digital signature of text information included in the image I4. In such a case, the image I4 is subjected to an optical character recognition (OCR) process and the output of the OCR process (that is, the text information) is subjected to a digital-signature generating process.

According to the present invention, the information showing that printed material is the original is not limited to the above examples, and various other information may also be used.

As described above, the ground image generated by the image-processing apparatus according to the present embodiment includes the latent image area constructed of dots which are small relative to the resolution of a copy machine which reads the ground image and the background area constructed of dots which are large relative to the resolution of the copy machine. In order to determine whether printed material is an original or a copy, a scanner having a resolution high enough to read the dots in the latent image area is used for reading the additional information attached to the latent image area of the original. When the printed material is a copy, the additional information attached to the latent image area is deleted along with the latent-image element when the copy is made. Therefore, it is difficult to read the additional information even when the scanner having a resolution high enough to read the dots in the latent image area is used.

The determination of whether printed material is an original or a copy can of course be achieved by other methods by adjusting the sizes of the dots included in the latent image area and the background area and the resolutions of the scanner and the printer with which the ground image is printed.

Thus, according to the present embodiment, the information showing that printed material is the original is attached to the original as the additional information in advance and whether printed material is an original or a copy can be determined in accordance with the result of extraction of the additional information.

Second Embodiment

In the first embodiment, the additional information is attached only to the latent image area in the ground image I1 which includes the latent image area and the background area. However, the additional information may also be attached to the background area in addition to the latent image area. In the present embodiment, a case in which the additional information is attached not only to the latent image area but also to the background area will be described.

The basic construction of a computer which functions as an image-processing apparatus according to the present embodiment is the same as that shown in FIG. 1. In addition, the functional structure of the image-processing apparatus according to the present embodiment is the same as that shown in FIG. 2. However, the process performed by the information-attaching unit 12 is different from that of the first embodiment. Accordingly, the information-attaching unit 12 according to the present embodiment will be described below.

FIG. 13 is a flowchart showing an information-attaching process performed by the information-attaching unit 12 according to the present embodiment.

Processes performed in Steps 121 and 122 are the same as those performed in Steps 51 and 52, respectively, in the flowchart of FIG. 7. More specifically, the image I1' is generated from the image I1 and is divided into a plurality of blocks.

Next, parameters i, j1, and j2 are initialized to 0. The parameter i is an index for each of the blocks divided in Step 122, the parameter j1 is an index showing the bit position in first additional information included in the additional information Inf, and the parameter j2 is an index showing the bit position in second additional information included in the additional information Inf. The first additional information and the second additional information will be described below.

Next, in Step 124, it is determined whether the $i^{th}$ block in the image I1 belongs to the latent image area or the background area.

In order to determine the area to which the $i^{th}$ block belongs, the area-assignment information R designated in Step 21 is used. When the corresponding bit in the area-assignment information R is "1", it is determined that the $i^{th}$ block belongs to the latent image area. When the corresponding bit in the area-assignment information R is "0", it is determined that the $i^{th}$ block belongs to the background area.

Whether the $i^{th}$ block in the image I1 belongs to the latent image area or the background area can be determined on the basis of the determination result of whether the $i^{th}$ block in the image I1' belongs to the latent image area or the background area.

The process proceeds to Step 125 when it is determined that the $i^{th}$ block in the image I1 belongs to the latent image area, and to Step 126 when it is determined that the $i^{th}$ block in the image I1 belongs to the background area.

The first additional information is selected from the additional information Inf in Step 125, and the second additional information is selected from the additional information Inf in Step 126. The first additional information and the second additional information will be described below. In the present embodiment, the additional information Inf includes the first additional information and the second additional information. The first additional information may be, for example, information showing that printed material is the original similar to the above-described first embodiment, and the second additional information may be, for example, information showing that copying is prohibited, information regarding the output printer, information regarding the date and time of printing, information regarding the user who outputted the printed material, etc.

Thus, according to the present embodiment, the additional information Inf may include M+N bits where M high-order bits represent the first additional information and N low order bits represent the second additional information.

Processes performed in Steps 127, 128, 129, and 1210 are the same as those performed in Steps 56, 57, 58, and 59, respectively.

More specifically, in Step 127, it is determined whether the $j^{th}$ bit of the additional information selected in Step 125 or 126 (that is, $j1^{th}$ bit when the first additional information is selected and $j2^{th}$ bit when the second additional information is selected) is "0" or "1". When the $j^{th}$ bit is "0", each of the dots included in the $i^{th}$ block is moved in accordance with a predetermined first information-attachment rule in Step 128. When the $j^{th}$ bit is "1", each of the dots included in the $i^{th}$ block is moved in accordance with a predetermined second information-attachment rule in Step 129.

The first and second information-attachment rules are the same as those described above, and explanations thereof are thus omitted.

Then, in Step 1210, it is determined whether or not all of the bits of the additional information are attached to the $i^{th}$ block. More specifically, it is determined whether or not all of the bits of the first additional information are attached if the $i^{th}$ block belongs to the latent image area, and it is determined whether or not all of the bits of the second additional information are attached if the $i^{th}$ block belongs to the background area.

When it is determined that all of the bits are attached, the process proceeds to Step 1211. When it is determined that not all of the bits are attached, the process proceeds to Step 1212.

In Step 1211, j1 or j2 is initialized to 0 depending on whether the $i^{th}$ block belongs to the latent image area or the background area. More specifically, when the $i^{th}$ block belongs to the latent image area, j1 is initialized to 0 for the process of attaching the additional information to the next block since all of the bits of the first additional information are already attached to the latent image area in Step 1211.

When the $i^{th}$ block belongs to the background area, j2 is initialized to 0 for the process of attaching the additional information to the next block since all of the bits of the second additional information are already attached to the background area in Step 1211.

In Step 1212, j1 or j2 is incremented by 1 depending on whether the $i^{th}$ block belongs to the latent image area or the background area. More specifically, when the $i^{th}$ block belongs to the latent image area, j1 is incremented by 1 since the bit of the first additional information used next is the $(j1+1)^{th}$ bit. When the $i^{th}$ block belongs to the background area, j2 is incremented by 1 since the bit of the second additional information used next is the $(j2+1)^{th}$ bit.

Processes performed in Steps 1213 and 1214 are the same as those performed in Steps 512 and 55. More specifically, it is determined whether or not all of the blocks are processed in Step 1213. When it is determined that all of the blocks are processed, the information-attaching process is finished. When it is determined that not all of the blocks are processed, the process proceeds to Step 1214 and the parameter i is incremented by 1. Then, Step 124 and the following steps are performed again.

Accordingly, the composite image I4 in which the additional information is attached to both the latent image area and the background area is obtained.

The first additional information and the second additional information can be read from the composite image I4 according to the present embodiment by applying the method described above in the first embodiment to each of the latent image area and the background area.

As described above, according to the present embodiment, the first additional information is attached to the latent image area and the second additional information is attached to the background area. Therefore, according to the present embodiment, the first additional information and the second additional information can be read correctly from the original on which the composite image I4 is recorded (printed material which is not a copy), whereas the first additional information cannot be read correctly and only the second additional information can be read correctly from a copy thereof (printed material obtained by copying the original).

Therefore, it can be determined whether printed material is an original or a copy by using the information showing that printed material is the original as the first additional information. In addition, when the information showing that copying is prohibited is attached as the second additional information and a copy machine can read the second additional information and has a function to control the copying process depending on the second additional information, it is possible to stop the copying process when the copy machine reads the information showing that copying is prohibited.

When the copy machine cannot read the second additional information and does not have a function to control the copying process depending on the second additional information, the copying process is performed but the above-described warning message corresponding to the area-assignment information R can be shown on the printed material.

In addition, when information regarding the output printer, information regarding the date and time of printing, information regarding the user who outputted the printed material, etc., are attached as the second additional information, it is possible to specify the date and time of printing, the printer used, the user, etc.

Third Embodiment

In the first embodiment, the dots are moved in accordance with the information-attachment rules shown in FIGS. 8A and 8B. However, various other information-attachment rules may also be applied. In the present embodiment, a case in which combinations of different kinds of dots are used as the information-attachment rules will be described.

Figure 14A:
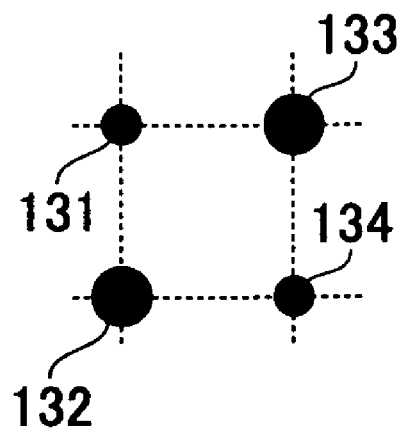
FIG. 14A is a diagram showing a first information-attachment rule used in a third embodiment of the present invention.
Figure 14B:
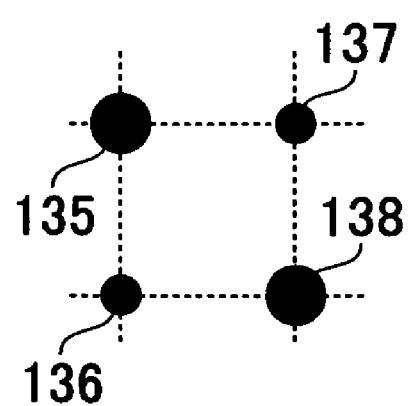
FIG. 14B is a diagram showing a second information-attachment rule used in the third embodiment of the present invention.

FIGS. 14A and 14B are diagrams showing the information-attachment rules according to the present embodiment. FIG. 14A shows the first information-attachment rule and FIG. 14B shows the second information-attachment rule.

In FIGS. 14A and 14B, dots 131, 134, 136, and 137 are small dots and dots 132, 133, 135, and 138 are medium dots. In the present embodiment, the latent image area is constructed of small dots and the medium dots. The size of the medium dots is between those of the small dots and the large dots.

The size of the medium dots may either be set such that the medium dots are deleted when they are copied or such that the medium dots are not deleted when they are copied. When the size of the medium dots is set such that the medium dots are deleted when they are copied, the effect similar to that of the first embodiment can be obtained when a copy is made. When the size of the medium dots is set such that the medium dots are not deleted when they are copied, the density of the latent image area is reduced compared to that of the background area when a copy is made since the small dots are deleted. More specifically, compared to the case in which the size of the medium dots is set such that the medium dots are deleted when they are copied, the contrast between the region inside the warning message (i.e. the latent image area) and the region outside the warning message (i.e. the background area) decreases.

With reference to FIGS. 14A and 14B, in order to attach the additional information to the latent image area, the latent-image element shown in FIG. 5B is converted as shown in FIG. 14A when the first information-attachment rule is applied and is converted as shown in FIG. 14B when the second information-attachment rule is applied. Since the information of a single bit is represented by four dots according to the information-attachment rules shown in FIGS. 14A and 14B, the dots of the adjacent blocks may overlap each other when all of the blocks are converted as shown in FIG. 14A or 14B. In such a case, the index i is incremented such that the blocks on, for example, alternate rows or columns are processed.

Figure 15:
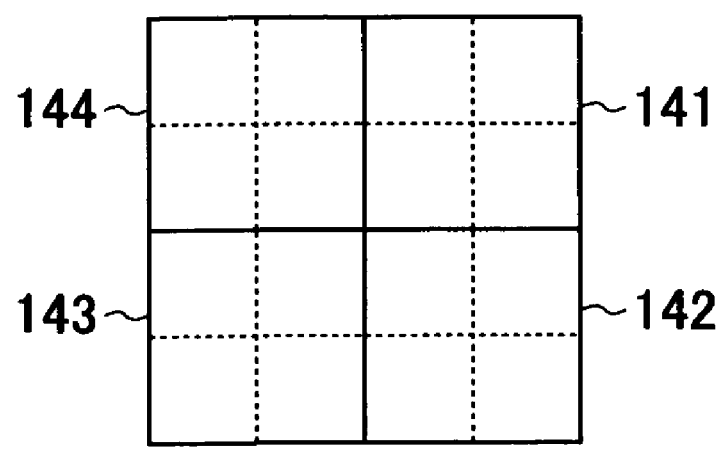
FIG. 15 is a diagram for explaining a method of reading additional information which is attached to the latent image area in accordance with the information-attachment rules shown in FIGS. 14A and 14B.

FIG. 15 is a diagram for explaining a method of reading the additional information attached to the latent image area in accordance with the information-attachment rules shown in FIGS. 14A and 14B. In FIG. 15, reference numeral 141 shows a region where the upper right dot (the dots 133 and 137 in FIGS. 14A and 14B, respectively) is positioned in a single block. Similarly, reference numeral 142 shows a region where the lower right dot (the dots 134 and 138 in FIGS. 14A and 14B, respectively) is positioned in a single block, reference numeral 143 shows a region where the lower left dot (the dots 132 and 136 in FIGS. 14A and 14B, respectively) is positioned in a single block, and reference numeral 144 shows a region where the upper left dot (the dots 131 and 135 in FIGS. 14A and 14B, respectively) is positioned in a single block.

In order to read the information, the densities of the regions 141, 142, 143, and 144 are calculated and the first sum of the densities of the regions 141 and 143 is compared with the second sum of the densities of the regions 142 and 144. It is determined that the first information-attachment rule is applied to this block when the first sum is greater than the second sum and that the second information-attachment rule is applied to this block when the first sum is less than the second sum.

In the present embodiment, the additional information is attached to the latent image area using the combinations of dots with different sizes. However, the additional information can also be attached to the background area. In such a case, the background element including only the large dot is replaced by, for example, a background element including large dots and medium dots.

Although the additional information is attached using the combinations of four dots in the present embodiment, the additional information may of course be attached using the combinations of other number of dots.

Fourth Embodiment

As shown in FIG. 2, in the above-described embodiments, the ground image I1 is generated first, and the image I2 is generated by attaching the additional information to the ground image I1. However, the ground image may also be generated in accordance with the additional information. In the present embodiment, a case in which the ground image is generated in accordance with the additional information will be described.

Figure 16:
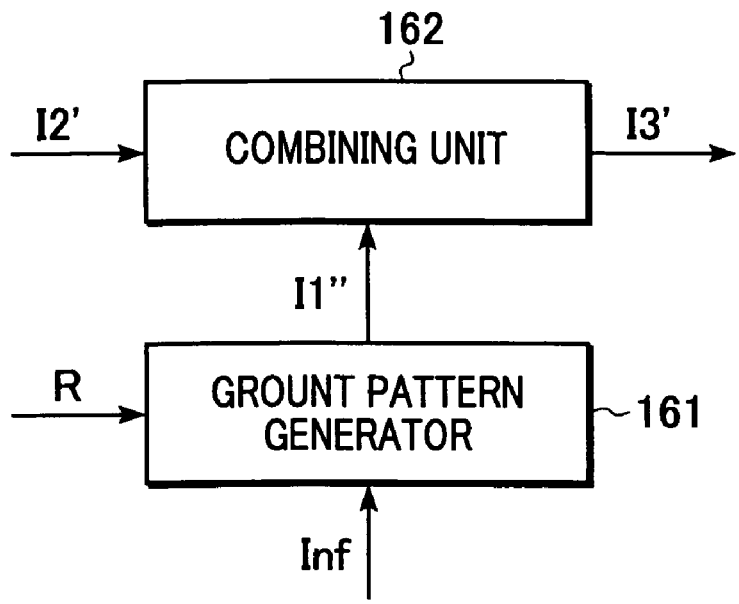
FIG. 16 is a diagram showing the functional structure of an image-processing apparatus according to a fourth embodiment of the present invention.

FIG. 16 is a diagram showing the functional structure of an image-processing apparatus according to the present embodiment. Although components shown in the figure may be constructed as hardware, they are provided as software in the present embodiment. More specifically, software programs for achieving the functions of the components shown in FIG. 16 are stored in the HD 116, the CD-ROM 117, the FD 118, the DVD-ROM 119, etc. The software programs are loaded into the RAM 115, and the CPU 113 executes them to achieve the functions of the components shown in the figure. Thus, the basic construction of a computer which functions as the image-processing apparatus according to the present embodiment is the same as that shown in FIG. 1.

As shown in FIG. 16, the image-processing apparatus according to the present embodiment includes a ground-image generator 161 and a combining unit 162.

The ground-image generator 161 receives additional information Inf and area-assignment information R, generates a ground image I1″ in accordance with the additional information Inf and the area-assignment information R, and outputs the ground image I1″ to the combining unit 162.

A ground-image-generating process performed by the ground-image generator 161 according to the present embodiment will be described below. In the present embodiment, the ground image I1″ is generated in accordance with the flowchart shown in FIG. 4. However, when the latent-image element and the background element shown in FIGS. 5A to 5D are arranged in Steps 25 and 26, the dots are not disposed at positions shown in FIGS. 5A to 5D but at positions corresponding to the additional information in accordance with predetermined information-attachment rules.

Figure 17A:
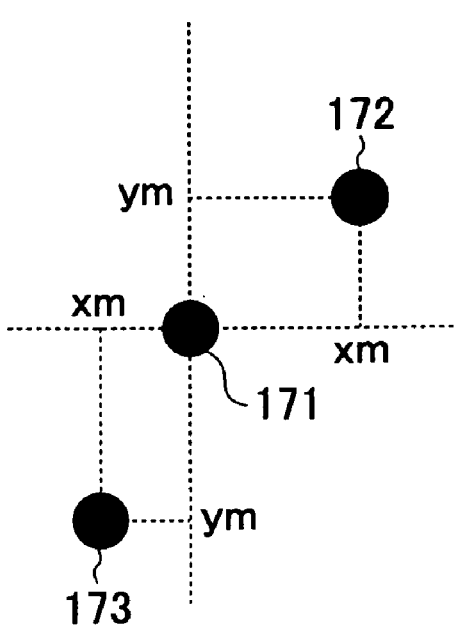
FIGS. 17A and 17B are diagrams for explaining a process of generating a ground image I1" according to the fourth embodiment of the present invention.
Figure 17B:
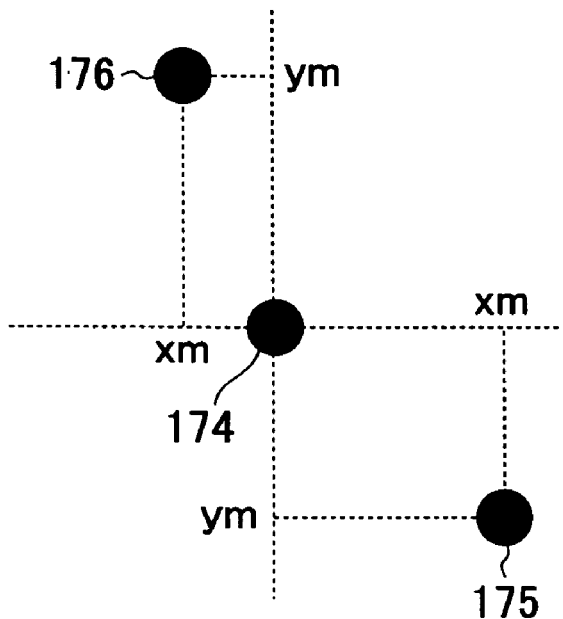

FIGS. 17A and 17B are diagrams for explaining a process of generating the ground image I1″ according to the present embodiment. FIG. 17A shows the arrangement of the dot in the case in which the first information-attachment rule is applied for generating the ground image I1″ and FIG. 17B shows the arrangement of the dot in the case in which the second information-attachment rule is applied for generating the ground image I1″.

In FIGS. 17A and 17B, reference numerals 171 and 174 show the position where the dot is arranged when the ground image I1 is generated by a method according to the first embodiment. As shown in the figures, according to the present embodiment, the dot is arranged at the same position as the position to which the dot is moved in FIGS. 8A and 8B. More specifically, in the present embodiment, the additional information is not attached by moving the dots included in the ground image in accordance with the predetermined rules after the ground image is generated but is attached in the step of generating the ground image by arranging the dots in accordance with the predetermined rules.

In FIG. 17A, the dots 172 and 173 respectively correspond to the dots 63 and 62 shown in FIG. 8A. In addition, in FIG. 17B, the dots 176 and 175 respectively correspond to the dots 66 and 65 shown in FIG. 8B.

The ground image generated in this manner is similar to the above-described image I2 according to the first embodiment.

The combining unit 162 receives an image I2′ and the ground image I1″, combines the image I2′ and the ground image I1″, and thereby generates a composite image I3′. The composite image I3′ is converted into print data by a printer driver installed in the HD 116, is output to the printer 1114 via the I/F 1111, and is recorded on the recording medium such as a paper sheet and an OHP film. A combining process performed by the combining unit 162 is the same as that of the first embodiment, and explanations thereof are thus omitted.

Although a modification of the ground-image-generating process according to the first embodiment is used in the present embodiment, a modification of the ground-image-generating process according to the third embodiment may also be used.

Fifth Embodiment

In the first embodiment, the additional information is attached only to the latent image area in the ground image I1 which includes the latent image area and the background area. In the second embodiment, the additional information is attached not only to the latent image area but also to the background area. However, the present invention is not limited to this, and the additional information may also be attached only to the background area. In the present embodiment, a case in which the additional information is attached only to the background area will be described.

The basic construction of a computer which functions as an image-processing apparatus according to the present embodiment is the same as that shown in FIG. 1. In addition, the functional structure of an image-processing apparatus according to the present embodiment is the same as that shown in FIG. 2. However, the process performed by the information-attaching unit 12 is different from that of the first embodiment. Accordingly the information-attaching unit 12 according to the present embodiment will be described below.

Figure 18:
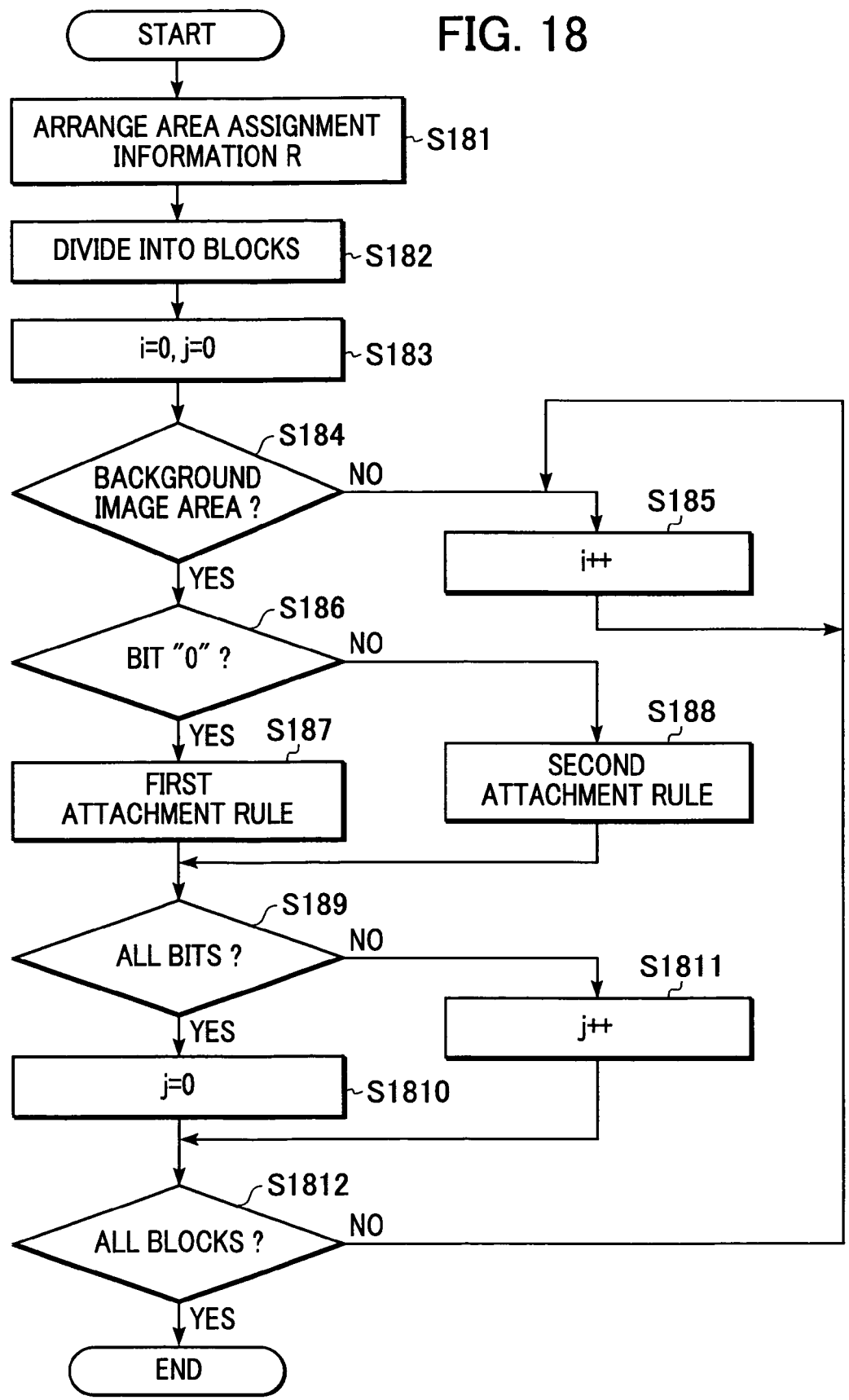
FIG. 18 is a flowchart of an information-attaching process according to a fifth embodiment of the present invention.

FIG. 18 is a flowchart showing an information-attaching process according to the present embodiment. With reference to the flowchart of FIG. 18, processes performed in Steps 181 to 183 are the same as those performed in Steps 51 to 53, respectively. However, in Step 184, different from Step 54, the process flow is divided such that the additional information is attached only to the background area.

In addition, in the flowchart shown in FIG. 18, although the processes performed in Steps 185 to 1812 are basically the same as those performed in Steps 55 to 512, the background area is processed in the present embodiment whereas the latent image area is processed in the first embodiment.

Accordingly, the additional information is attached only to the background area.

Other Embodiments

The object of the present invention may also be achieved by supplying a system or an apparatus with a recording medium (or a storage medium) which stores a program code of a software program for implementing the functions of the above-described embodiments and causing a computer (or CPU or MPU) of the system or the apparatus to read and execute the program code stored in the storage medium. In such a case, the program code itself which is read from the storage medium provides the functions of the above-described embodiments, and thus the storage medium which stores the program code constitutes the present invention.

In addition, the functions of the above-described embodiments may be achieved not only by causing the computer to read and execute the program code but also by causing an operating system (OS) running on the computer to execute some or all of the processes on the basis of instructions of the program code.

Furthermore, the functions of the above-described embodiments may also be achieved by writing the program code read from the storage medium to a memory of a function extension card inserted in the computer or a function extension unit connected to the computer and causing a CPU of the function extension card or the function extension unit to execute some or all of the processes on the basis of instructions of the program code.

When the present invention is applied to a storage medium as described above, program codes corresponding to the above-described flowcharts are stored in the recording medium.

According to the above-described embodiments, printed material which has an effect similar to that of security paper can be output using normal paper instead of specially printed paper such as the security paper.

In addition, it can be determined whether printed material is an original or a copy by attaching the information showing that printed material is the original such that it is deleted when the printed material is copied.

In addition, by attaching the information showing that copying is prohibited such that it is not deleted when the printed material is copied, the printed material can be prevented from being copied.

In addition, the information regarding the date and time of printing, the printer used, the user, etc., may also be shown as marks similar to the warning message.

In addition, when the ground image is constructed of dots, additional information can also be attached using the dots.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   inputting means for inputting area-assignment information that defines latent-image area and background area and binary additional information composed of a sequence of bit values (0 or 1);
   determination means for determining a plurality of positions in the background area which is defined by the area-assignment information and a plurality of positions in the latent-image area which is defined by the area-assignment information;
   generating means for generating patterned image data by arranging first dots of a first dot size at the determined positions in the background area and arranging second dots of a second dot size that is a smaller dot size than the first dot size at the determined positions in the latent-image area, the first dots being easily reproducible when copied and the second dots not being easily reproducible when copied; and
   information-attaching means for attaching the binary additional information to at least the latent image area by moving at least the arranged second dots such that it can be determined whether an image on a printed material is an original because the binary additional information can be extracted from the original image based on the positions of the moved second dots and predetermined positions in the latent-image area, and the binary additional information cannot be extracted from a copy, the information-attaching means moving each second dot from the predetermined position along a direction which is defined by a bit value at a corresponding bit position in the sequence of bit values (0 or 1) of the binary additional information.

2. The image processing apparatus according to claim 1, wherein the binary additional information can be extracted based on the difference between the positions of the moved second dots and predetermined positions in the vertical axis and the difference between the positions of the moved second dots and the predetermined positions in the horizontal axis.

3. The image processing apparatus according to claim 2, wherein the binary additional information can be extracted based on whether the result of multiplication of the difference between the positions of the moved second dots and predetermined positions in the vertical axis and the difference between the positions of the arranged second dots and the predetermined positions in the horizontal axis is negative or positive.

4. The image processing apparatus according to claim 1, wherein the length between each of positions of the arranged second dots and each of the predetermined positions is less than half of the length between two of the predetermined positions.

5. The image processing apparatus according to claim 4, wherein the positions of the arranged second dots correspond to the predetermined positions on a one-to-one basis.

6. An image processing method comprising:
   inputting area-assignment information that defines latent-image area and background area and binary additional information composed of a sequence of bit values (0 or 1);
   determining a plurality of positions in the background area which is defined by the area-assignment information and a plurality of positions in the latent-image area which is defined by the area-assignment information;
   generating patterned image data by arranging first dots of a first dot size at the determined positions in the background area and arranging second dots of a second dot size that is a smaller dot size than the first dot size at the determined positions in the latent-image area, the first dots being easily reproducible when copied and the second dots not being easily reproducible when copied;
   attaching the binary additional information to at least the latent image area by moving at least the arranged second dots such that it can be determined whether an image on a printed material is an original because the binary additional information can be extracted from the original image based on the positions of the moved second dots and predetermined positions in the latent-image area, and the binary additional information cannot be extracted from a copy, each second dot being moved from the predetermined position along a direction which is defined by a bit value at a corresponding bit position in the sequence of bit values (0 or 1) of the binary additional information.

7. The image processing method according to claim 6, wherein the binary additional information can be extracted based on the difference between the positions of the moved second dots and predetermined positions in the vertical axis and the difference between the positions of the moved second dots and the predetermined positions in the horizontal axis.

8. The image processing method according to claim 7, wherein the binary additional information can be extracted based on whether the result of multiplication of the difference between the positions of the moved second dots and predetermined positions in the vertical axis and the difference between the positions of the moved second dots and the predetermined positions in the horizontal axis is negative or positive.

9. The image processing method according to claim 6, wherein the length between each of positions of the arranged second dots and each of the predetermined positions is less than half of the length between two of the predetermined positions.

10. The image processing method according to claim 9, wherein the positions of the arranged second dots correspond to the predetermined positions on a one-to-one basis.

11. An image processing apparatus, comprising:
an inputting unit capable of inputting patterned image data, which includes first dots of a first dot size at determined positions in a background area and second dots of a second dot size that is a smaller dot size than the first dot size at determined positions in a latent-image area, the first dots being easily reproducible when copied and the second dots not being easily reproducible when copied, each of the second dots in the patterned image data being moved from the determined position along a direction which is determined by a bit value at a corresponding bit position in a sequence of bit values (0 or 1) of binary additional information;
an extracting unit configured to extract the binary additional information from the binary additional information of the input image data;
an outputting unit configured to output the extracted binary additional information as digital data; and
a determining unit configured to determine whether the input image is original or not according to the output digital data.

12. The image processing apparatus according to 11, wherein the outputting unit outputs NULL in the case that the extracting unit could not extract the binary additional information.

13. An image processing method, comprising:
inputting patterned image data, which includes first dots of a first dot size at determined positions in a background area and second dots of a second dot size that is a smaller dot size than the first dot size at determined positions in a latent-image area, the first dots being easily reproducible when copied and the second dots not being easily reproducible when copied, each of the second dots in the patterned image data being moved from the determined position along a direction which is determined by a bit value at a corresponding bit position in a sequence of bit values (0 or 1) of binary additional information;
extracting the binary additional information from the binary additional information of the input image data;
outputting the extracted binary additional information as digital data; and
determining whether the input image is original or not according to the output digital data.

14. The image processing method according to claim 13, wherein NULL is output in a case in which the binary additional information could not be extracted.

* * * * *